United States Patent

Nagata et al.

[11] Patent Number: 5,727,811
[45] Date of Patent: Mar. 17, 1998

[54] STEERING WHEEL WITH AIR BAG DEVICE

[75] Inventors: Atsushi Nagata; Tooru Koyama, both of Aichi, Japan

[73] Assignee: Toyoda Gosei Co., Ltd., Aichi, Japan

[21] Appl. No.: 616,269

[22] Filed: Mar. 15, 1996

[30] Foreign Application Priority Data

Apr. 27, 1995 [JP] Japan .................. 7-104337
May 12, 1995 [JP] Japan .................. 7-114470

[51] Int. Cl.⁶ .................................. B60R 21/22
[52] U.S. Cl. .................................... 280/731
[58] Field of Search ........................... 280/731

[56] References Cited

U.S. PATENT DOCUMENTS

| | | | |
|---|---|---|---|
| 5,085,462 | 2/1992 | Gualtier | 280/731 |
| 5,265,905 | 11/1993 | Shelton | 280/731 |
| 5,327,796 | 7/1994 | Ernst et al. | 280/731 |
| 5,371,333 | 12/1994 | Kanai et al. | 280/731 |

FOREIGN PATENT DOCUMENTS

| | | |
|---|---|---|
| 2200814 | 4/1974 | France . |
| 2-133955 | 11/1990 | Japan . |
| 06001246 | 1/1994 | Japan . |
| 06239241 | 8/1994 | Japan . |
| 06239242 | 8/1994 | Japan . |
| 06312643 | 11/1994 | Japan . |
| 7-12209 | 3/1995 | Japan . |
| 07137641 | 5/1995 | Japan . |

*Primary Examiner*—Kenneth R. Rice
*Attorney, Agent, or Firm*—Cushman Darby & Cushman, IP Group Of Pillsbury Madison & Sutro LLP

[57] ABSTRACT

In a steering wheel with an air bag device, a horn pad is provided above the air bag device. The air bag device is arranged above a boss plate provided at the center of the steering wheel. Further, a horn switch mechanism operated by depressing the horn pad is provided. In the steering wheel, the horn pad is integral with a core covering portion of a steering wheel body, and a depressing plate is provided immediately below the horn pad. The air bag device is fixedly secured to the boss plate. The depressing plate is preferably substantially rigid, and is so shaped as to straddle the air bag. Resilient members resist the depression of the depressing plate, and pairs of contacts of the horn switch mechanism are provided between the depressing plate and the boss plate to actuate the horn.

14 Claims, 7 Drawing Sheets

STEERING WHEEL WITH AIR BAG DEVICE

FIELD OF THE INVENTION

The present invention relates to a steering wheel provided with an air bag device including a folded air bag and an inflator. The air bag device is disposed above a boss plate of a boss portion which is provided generally at the center of the steering wheel. A horn pad and a horn switch mechanism are provided above the air bag device.

BACKGROUND OF THE INVENTION

A typical example of a steering wheel includes a membrane switch buried therein (see, for example, Japanese Utility Model Publication Hei. 7-12209).

This conventional steering wheel has an air bag device which includes an inflatable air bag and a pad which covers the air bag and which has an H-shaped tear line which is broken upon inflation of the air bag. The air bag is provided above a boss portion, and the pad has two membrane switches for horn operation.

In the above-described steering wheel, the air bag device is designed as follows. The inflator is combined with the folded air bag, and a cap-shaped horn pad is provided so that it surrounds the air bag which is mounted on the flange of the inflator. The air bag device is then mounted on the boss plate of the steering wheel from above with a supporting member coupled to the boss plate.

Hence, it is necessary to form a horn pad as an individual component separate from the core resin cover portion (made of, for example, soft urethane resin) of the steering wheel. In addition, a gap necessarily is formed between the core resin cover portion and the horn pad, that is, the former is separated from the latter, which impairs the front design of the steering wheel.

Further, when the horn pad is depressed, it interferes with the upper surface of the air bag. That is, depressing the horn pad compresses the air bag. Hence, it is rather difficult for the operator to feel when the horn pad reaches the end of the horn operating stroke or when the horn is assuredly operated).

Furthermore, in combining the air bag device with a component such as a horn pad, the air bag is liable to be unfolded. Therefore, it is necessary to combine the air bag device with the component while holding the air bag, for instance, with the hand, so that it is maintained in its folded configuration. The installation of the air bag device is therefore inefficient and rather troublesome.

SUMMARY OF THE INVENTION

In view of the foregoing, a first object of the invention is to provide a steering wheel with an air bag device in which it is unnecessary to form the horn pad as an individual part, and in which the steering wheel and the horn pad appear unitary in front design. Therefore, the operator can feel when the horn pad comes to the end of the horn operating stroke.

A second object of the invention is to provide a steering wheel provided with a horn having improved operability.

A third object of the invention is to provide a steering wheel wherein the installation of an air bag device can be performed efficiently.

To achieve the aforementioned objects, an air bag device is provided above a boss plate of a boss portion provided at the center of the steering wheel. The air bag device includes a folded air bag and an inflator. Further, a horn pad and a horn switch mechanism are provided above the air bag device. The horn switch mechanism is operated by depressing the horn pad.

The horn pad is integral with a core cover portion of a steering wheel body. A depressing plate is provided immediately below the horn pad, and the air bag device is fixedly secured to the boss plate. The depressing plate is substantially rigid and has a breakable tear line in the top wall thereof which is broken upon inflation of the air bag. The depressing plate is so shaped as to straddle the air bag. Also, elastic members resisting depression of the depressing plate and pairs of contacts of the horn switch mechanism are provided between the depressing plate and the boss plate.

In the aforementioned construction, a membrane switch used in the horn switch mechanism may be provided immediately below the horn pad, and is operated by depressing the horn pad.

In this case, the membrane switch is provided as a first assembly, combined with the air bag device. The air bag is held folded with an air bag embracing member which is shaped to straddle the air bag and be supported on the rear side of the air bag. Hereupon, the air bag embracing member includes a top wall which has a breakable part which is broken upon inflation of the air bag, and is substantially covered with the membrane switch, except for the breakable part.

DETAILED DESCRIPTION OF THE PREFERRED EMBODIMENTS

The invention will be described with reference to its preferred embodiments shown in the accompanying drawings. However, it should be noted that the invention is not limited thereto or thereby.

1st Embodiment

A first embodiment of the present application will be described with reference to FIGS. 1 to 5.

Figure 1:
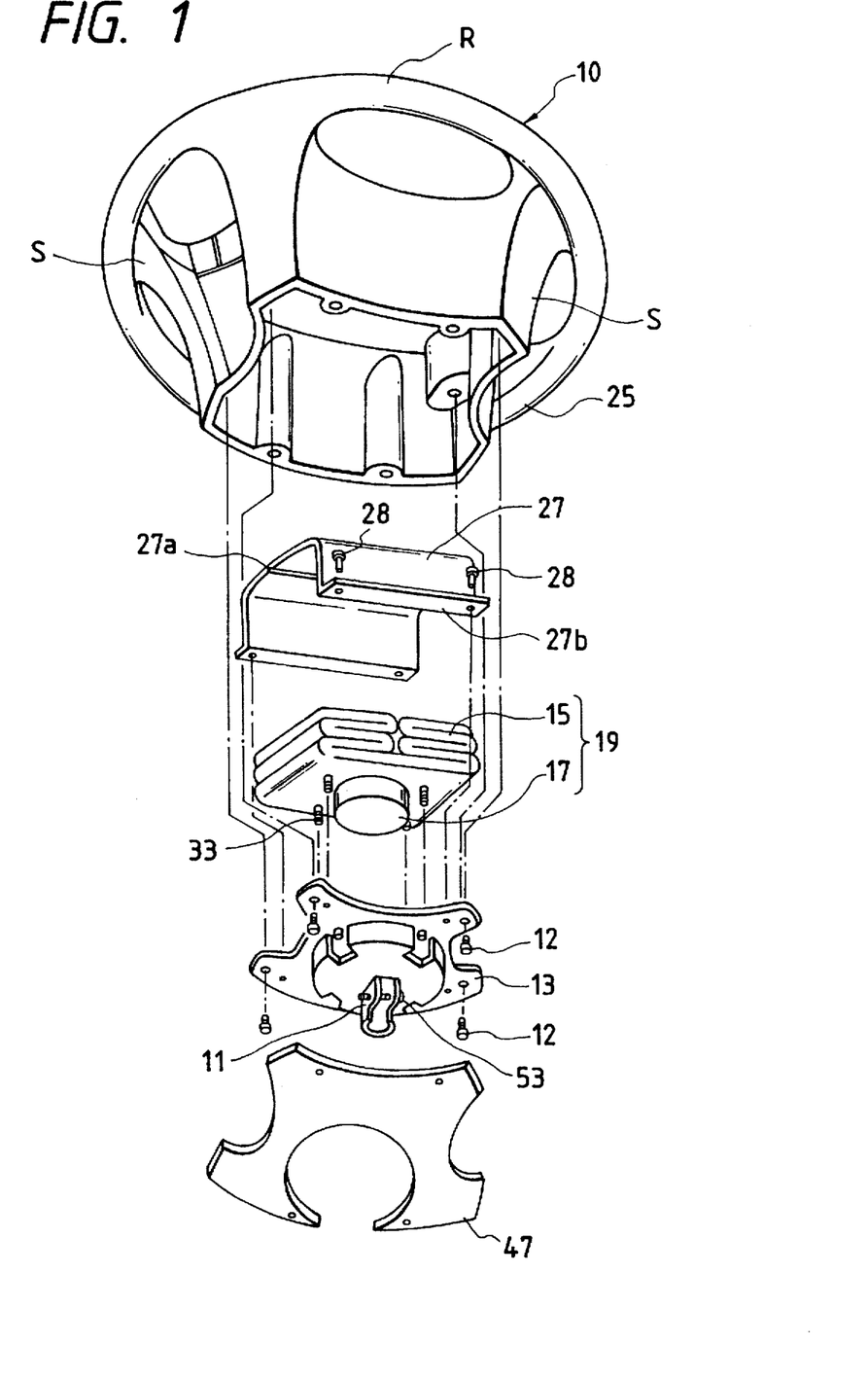
FIG. 1 is an exploded perspective view showing a first embodiment of a steering wheel assembly, according to the invention, as viewed from below.
Figure 2:
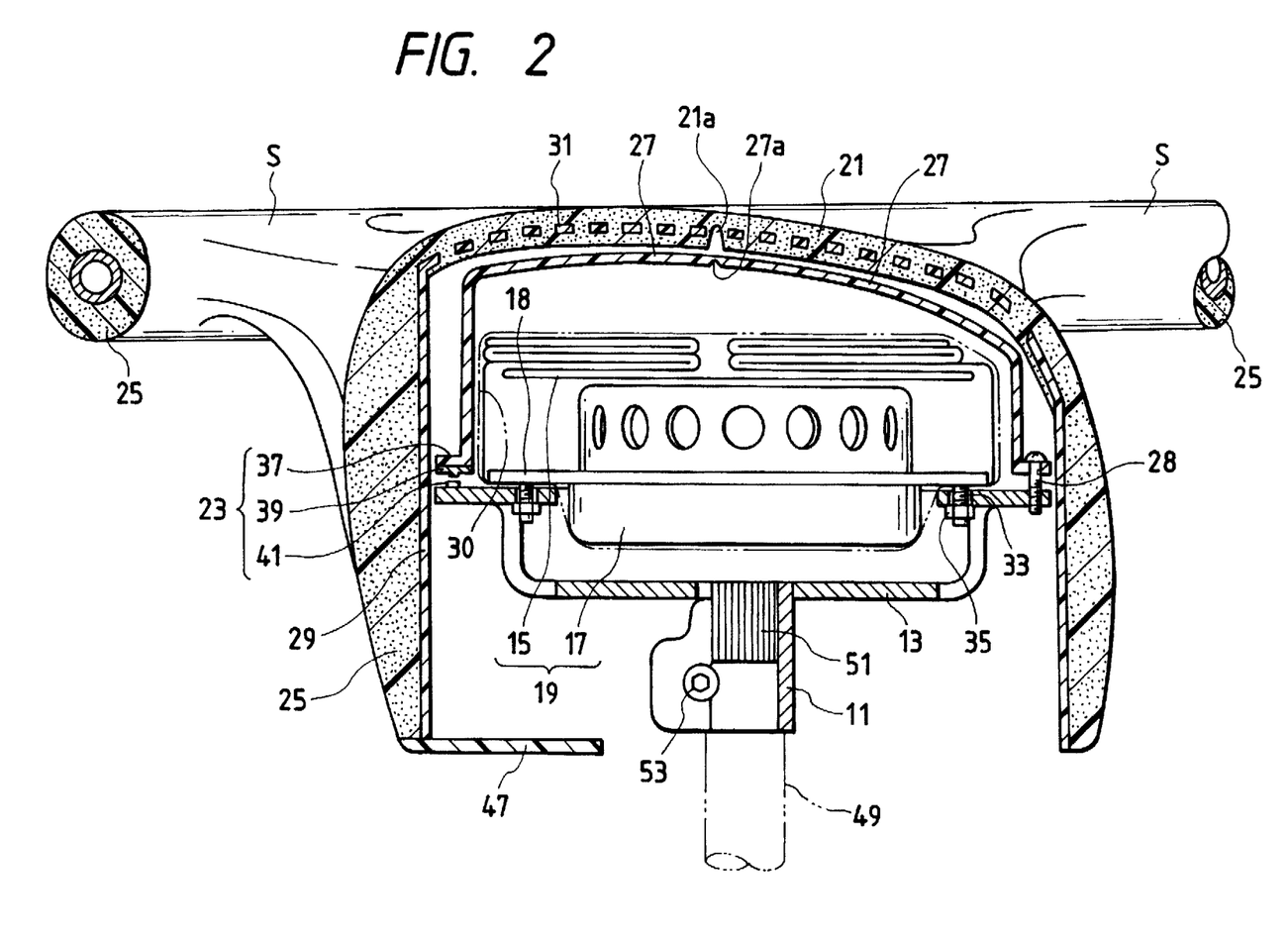
FIG. 2 is a side sectional view illustrating the arrangement of the steering wheel of the first embodiment.

In the first embodiment, an air bag device 19 is provided above a boss plate 13 of a boss portion 11, which is provided at the center of a steering wheel. The air bag device 19 includes a folded air bag 15, and an inflator 17. A horn pad 21 is provided above the air bag device 19. The first embodiment further includes a horn switch mechanism 23 which is operated by depressing the horn pad 21.

The horn pad 21 is integral with a core cover portion 25 of a steering wheel body 10. A depressing plate 27 is provided immediately below the horn pad portion 21. The air bag device 19 is fixedly secured to the boss plate 13.

The core cover portion 25 of the steering wheel includes a spoke portion S and a ring portion R. The core cover portion 25 is generally made of soft polyurethane foam resin or the like. The horn pad 21 has a thin breakable portion or tear line 21a which is broken upon inflation of the air bag. A configuration maintaining insert 29 is buried in the side wall of the horn pad 21, while a breakage preventing net insert 31 is buried in the top wall of the horn pad 21.

The air bag device is mounted on the boss plate 13 with, for example, nuts 35 threadably engaged with a plurality of mounting bolts 33 (four bolts in the drawings) which extend downwardly from the flange 18 of the inflator 17. The boss plate 13 is cup-shaped in sectional view so as to accommodate the lower portion of the flange 18 of the inflator 17, and it is partially cut out to allow the nuts 35 to be threadably engaged with the bolts 33.

The aforementioned depressing plate 27 is substantially rigid, and has a breakable groove (or a part to be broken) 27a in the top wall thereof which is broken when the air bag is inflated. The depressing plate 27 is substantially U-shaped in section so as to straddle the folded air bag 15.

Figure 3:
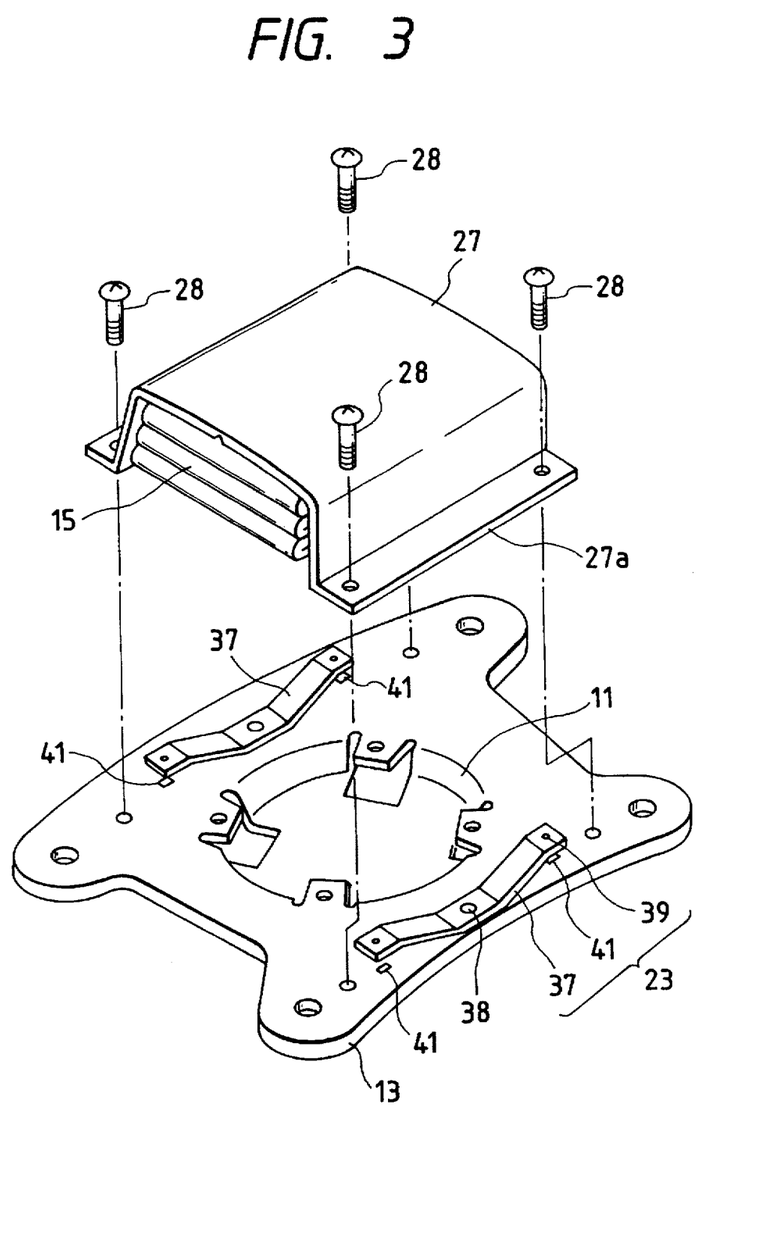
FIG. 3 is an exploded perspective view of certain components of the steering wheel of the first embodiment, as viewed from above.

In order to facilitate the mounting of the air bag 15, the depressing plate 27 shown in the figures is shaped like a laterally opened gate. However, it may also be in the form of a cylinder, for example. The depressing plate 27 is mounted on the boss plate 13 with a plurality of guide bolts 28 (four bolts 28 in the drawings). The depressing plate 27 is made from a hard plastic material, such as polyamide, which can be readily broken by a specifically applied force such as from the inflating airbag.

In order to facilitate mounting of the air bag device and improve the operability of the horn switch mechanism 23, the folded air bag is preferably compressed and bound with a sheet (or tape) 30 which can be readily broken upon inflation of the air bag.

A pair of leaf springs 37 resisting the depression force of the depressing plate 27, and opposing pairs of contacts 39 and 41 of the horn switch mechanism are provided between the depressing plate 27 and the boss plate 13.

Figure 4:
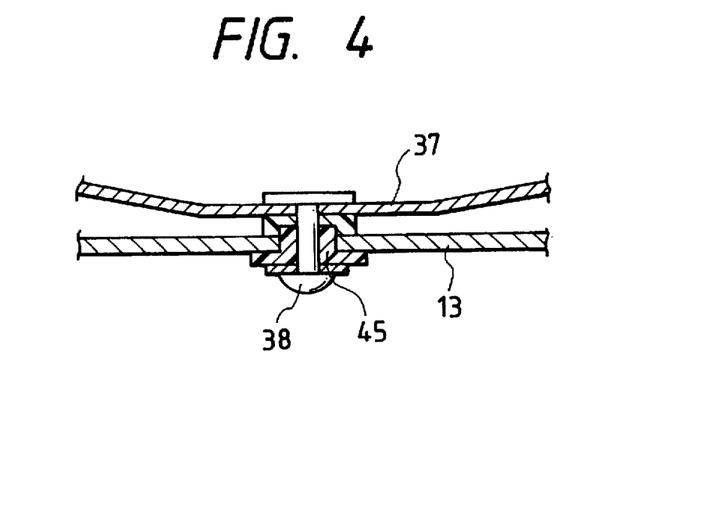
FIG. 4 is a sectional view illustrating the mounting of a downwardly curved leaf spring shown in FIG. 3.

More specifically, the end portions of the two side walls of the depressing plate 27 are formed into flanges 27b and 27b. The pair of leaf springs 37 are curved downwardly, and are provided between the boss plate 13 and the two flanges 27b. The bottom of each of the downwardly curved leaf springs 37 is secured through an insulator 45 to the boss plate 13 with a rivet 38. The contacts 39 are formed, as movable contacts, on the lower surfaces of both end portions of each of the leaf springs 37. The contacts 41 are formed, as stationary contacts, on the boss plate 13. The pairs of contacts 39 and 41 are thus provided.

Instead of the downwardly curved leaf springs 37, coil springs may be mounted on the guide bolts 28, for example. In this case, the movable contacts 39 are formed directly on the flanges 27a of the depressing plate 27.

The steering wheel of the invention is assembled as follows.

Figure 5:
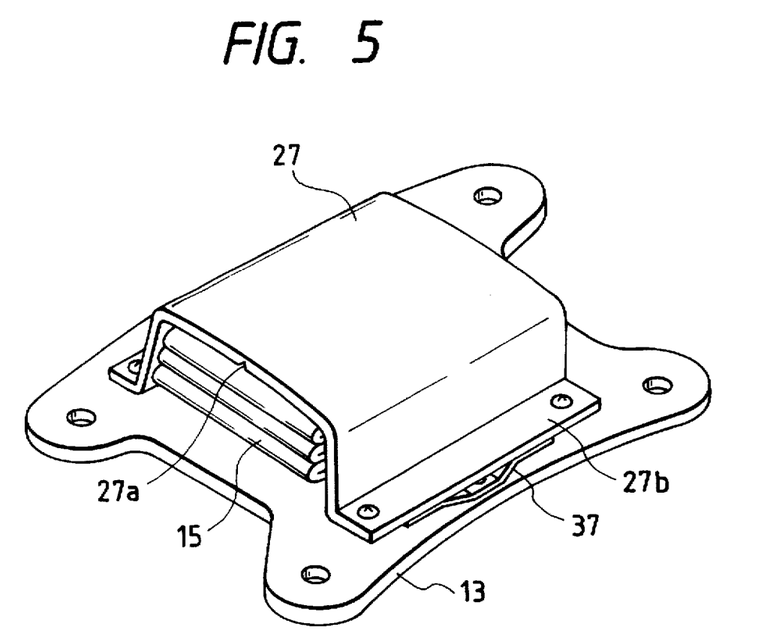
FIG. 5 is a perspective view of the components shown in FIG. 3 which have been assembled.

First, the air bag device 19, including the folded air bag 15 and the inflator 17, is mounted by screws on the boss plate on which the horn switch mechanism 23, including the downwardly curved leaf springs 37, has been mounted. The depressing plate 27 is laid over the air bag 15. The depressing plate 27 is then mounted on the boss plate 13 with the guide bolts 28 so that it is vertically movable over a predetermined distance (i.e., the horn operating stroke). The assembly of the air bag device, the horn switch mechanism, and the boss plate is coupled to the steering wheel body 10 from below with screws 12. Thereafter, a lower cover 47 is mounted. The boss portion 11 is fitted on the serrated portion 51 of the steering shaft 49, and is then tightened with screws 53.

The horn switch mechanism of the steering wheel thus assembled is operated by depression of the horn pad 21. In this operation, the depression force applied to the horn pad 21 is transmitted through the depressing plate 27 located immediately below the horn pad 21 to the leaf springs 37. Therefore, the end portions of the leaf springs 37 are moved downwardly until the movable contacts 39 contact the stationary contacts 41. The horn switch mechanism is therefore actuated so as to blow the horn. In this operation, the operator can positively feel through the fingers that the horn pad 21 has come to the end of the horn operating stroke. In addition, the steering wheel appears unitary in front design since the horn pad 21 is integral with a core cover portion 25 of a steering wheel body 10.

When the folded air bag 15 is bound with the sheet or tape or the like, a gap may be formed between the air bag 15 and the depressing plate 27. The gap is larger than the horn operating stroke. In this case, the problem is eliminated that, when the depressing plate 27 is depressed, the reaction force to compress the air bag 15 is applied through the depressing plate 27 to the operating portion of the horn pad 21. This feature further improves the operability of the horn pad 21.

2nd Embodiment

A second embodiment of the present application will be described with reference to FIGS. 6 to 9. Elements common to the first embodiment are supplied with like reference characters and the specific description thereof will be omitted.

Figure 6:
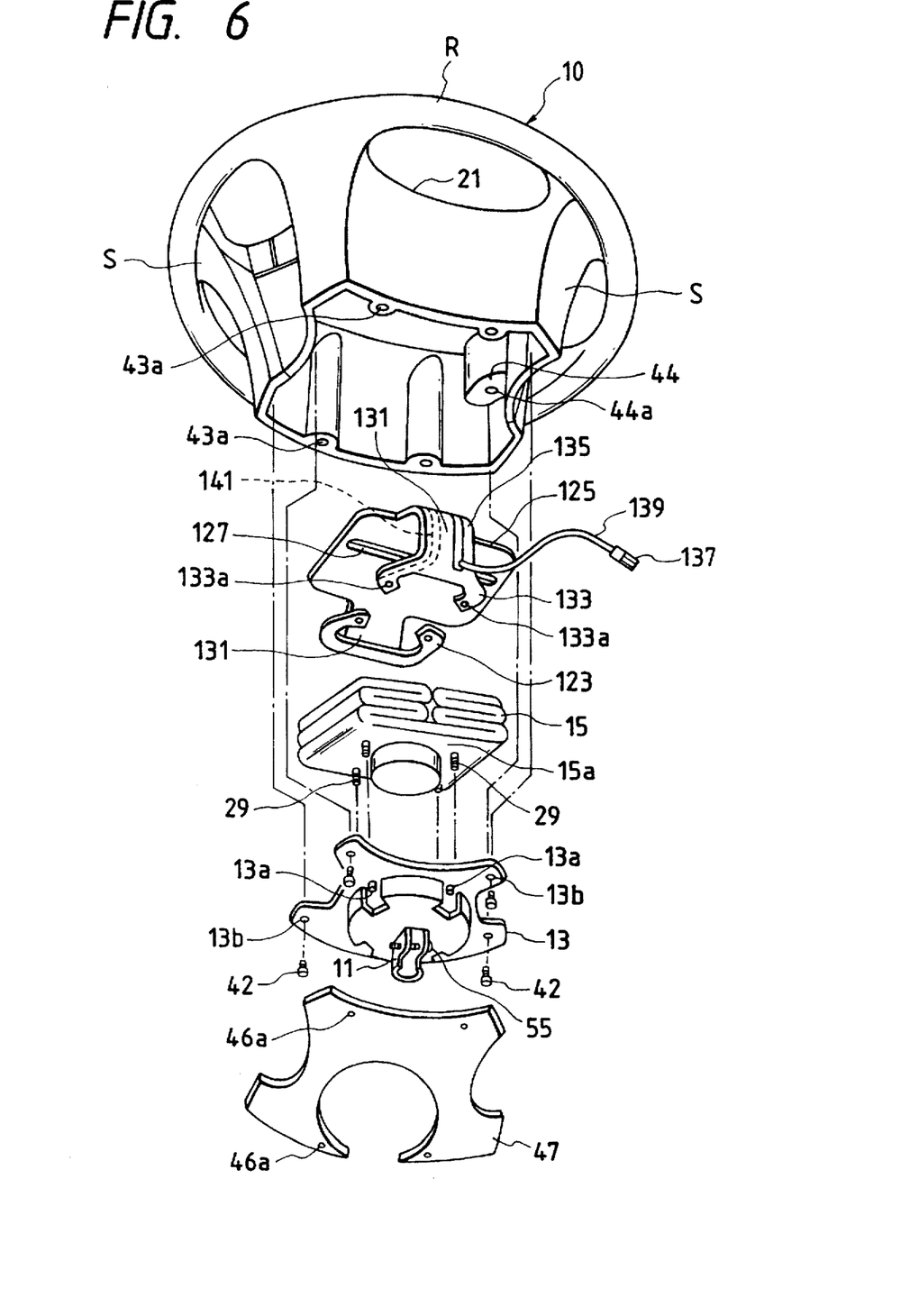
FIG. 6 is an exploded perspective view showing an example of a steering wheel with an air bag device according to the second embodiment, as viewed from below.

A steering wheel with an air bag device of the second embodiment is similar to the first embodiment. However, a membrane switch 123 is provided immediately below the horn pad 21. The membrane switch 123 is operated by depression of the horn pad 21.

The air bag device 19 and the membrane switch 123 are handled as one unit, that is, they are formed into a first assembly. The second embodiment is designed as follows.

The air bag 15 is held folded by an air bag embracing member 125 which straddles the air bag 15 and is supported on the rear side of the air bag 15 (as shown in FIGS. 2 and 3). The air bag embracing member 125 has a breakable part 127 in its top wall which is broken upon inflation of the air bag. The air bag embracing member top wall, except the breakable part 127, is substantially covered with a membrane switch 123.

Figure 7:
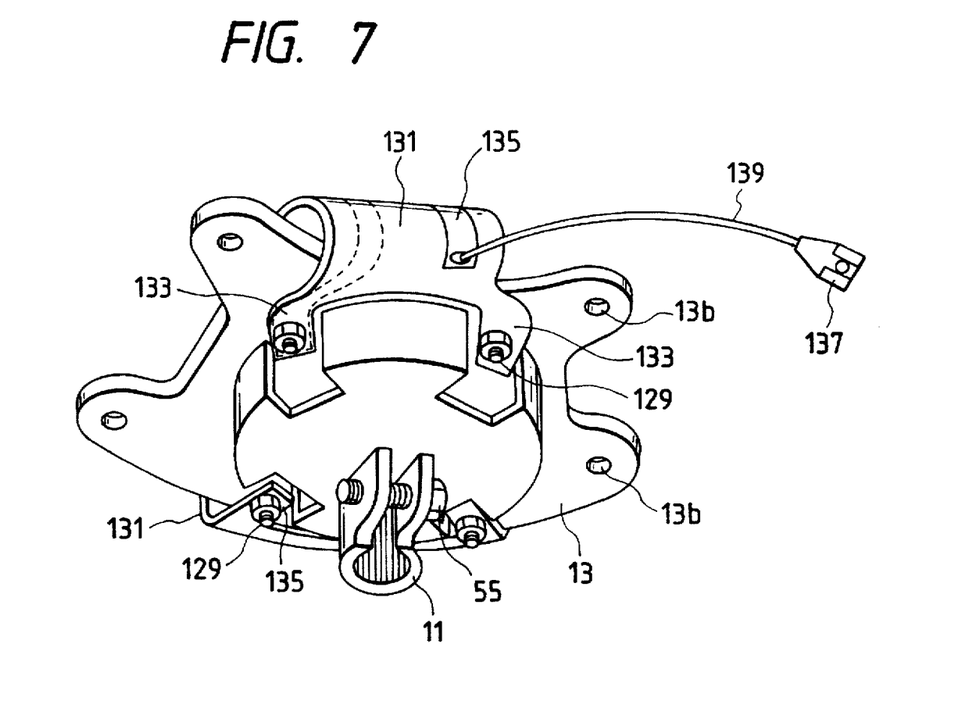
FIG. 7 is a perspective view of the assembly of an air bag device, a membrane switch, and a boss plate in the steering wheel of the second embodiment, as viewed from below.

More specifically, the air bag embracing member 125 is substantially C-shaped in sectional view having a pair of legs 131 and 131. The end portion of each of the legs 131 is split into two parts, namely, mounting seats 133 and 133. Each of the mounting seats 133 has a mounting hole 133a. The air bag embracing member 125 may be formed by using a macromolecular elastic material such as a thermo-plastic elastomer which is able to maintain the configuration of the member. However, it is preferably made of a hard plastic material, such as polyamide, which is somewhat elastic, but is generally substantially rigid. This allows the operator to feel that the horn pad has come to the end of the horn operating stroke.

Figure 8:
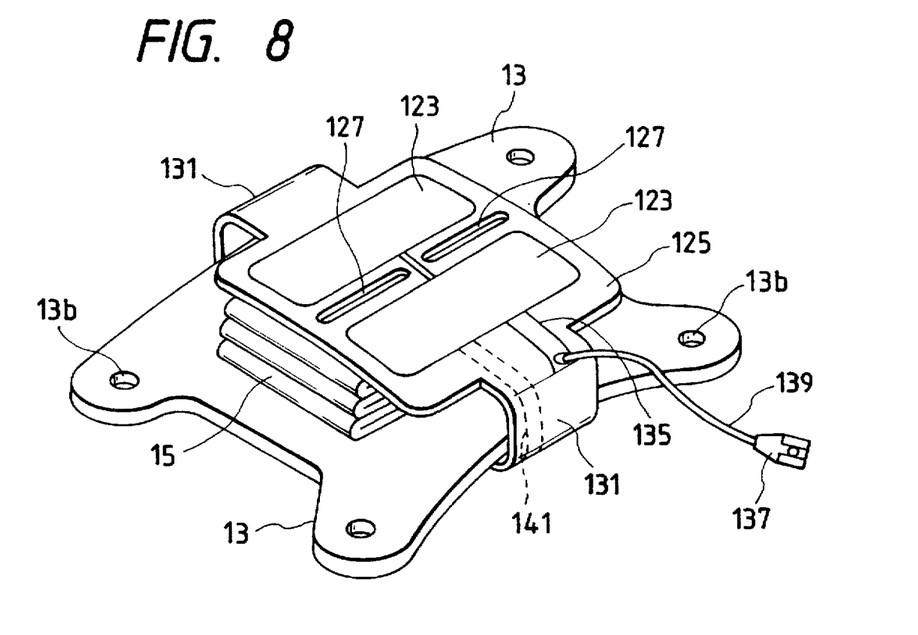
FIG. 8 is a perspective view of the assembly of FIG. 7 as viewed from above.

In the above-described embodiment, the breakable part 127 in the top wall of the air bag embracing member is made up of a pair of slits. However, it may be formed by locally decreasing the thickness of the top wall, or it may comprise a line of small holes. The membrane switch 123 is made up of a pair of planar electrodes of polyester film with a gap between them which are short-circuited upon depression of the horn. The positive electrode of the membrane switch 123 is connected to a horn mechanism (not shown) through a first printed wire 135 formed on the front surface of the air bag embracing member 125 and through a lead wire 139 having a connector 137 at the end thereof. The negative electrode of the membrane switch 123 is ground to the boss plate 13 through a second printed wire 141 formed on the rear surface of the air bag embracing member 125 in such a manner that it extends to the mounting hole 133a.

In the second embodiment, in order to improve the design of the steering wheel, the horn pad 21 is so formed that it is integral with a core cover portion 25 of a steering wheel body 10, as in the first embodiment. Also, the boss plate 13 can be combined with the first assembly of the air bag device 19 and the membrane switch 123. Accordingly, the boss plate 13 is provided as a second assembly which is combined with the first assembly, that is, the air bag device 19 and the membrane switch 123.

The air bag device 19, the boss plate 13, and the membrane switch 23 are assembled as follows. A plurality of mounting bolts 129 (four mounting bolts, as shown), which extend downwardly from the flange 18 of the inflator 17 through the peripheral portion 15a of the air bag 15 which is provided around inflator setting holes, are inserted into air bag device mounting holes 13a formed in the boss plate 13. Thereafter, the air bag embracing member 125 is set over the air bag 15 with its two legs 131 being opened against their elastic forces. The mounting bolts 129 are then inserted into the mounting holes 133a of the mounting seats 133 of those legs 131. Thereafter, nuts are threadably engaged with the mounting bolts 129 thus inserted. The boss plate 13 is cup-shaped in sectional view so as to accommodate the lower portion of the flange 18 of the inflator 17, and it is partially cut to allow the aforementioned nuts to be threadably engaged with the bolts 29.

In the above-described assembly, the air bag device 19 and the membrane switch 123 may be assembled with each other in advance. In this case, the mounting seats 133 of the air bag embracing member 125 are held between the boss plate 13 and the flange 18 of the inflator 17, as viewed in the drawings.

The steering wheel thus designed is assembled as follows.

Figure 9:
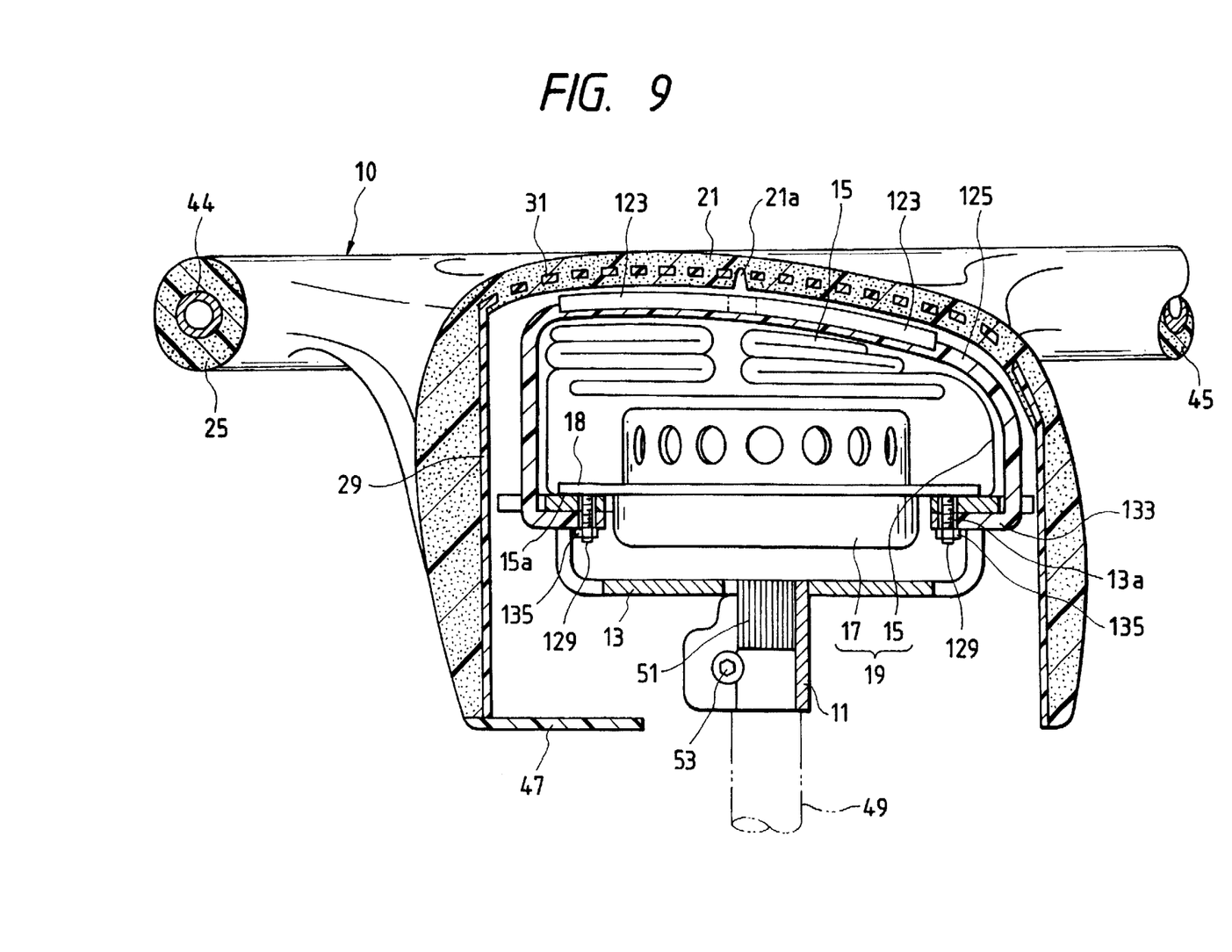
FIG. 9 is a side sectional view, with parts cut away, showing certain components of the steering wheel of the invention which have been assembled.

The assembly of the air bag device 19, the boss plate 13 and the air bag embracing member 25 (integral with the membrane switch 123) is combined with the steering wheel body 10 with which the horn pad is integral. That is, mounting screws 42 are screwed through mounting holes 13b formed in the boss plate 13 into mounting female-threaded holes 44a formed in the spoke core 44 of the steering wheel body 10. A serrated portion 51 of the boss portion 11 is fitted on the end portion of a steering shaft 49. In addition, with mounting holes 46a of a lower cover 47 being aligned with mounting holes 43a of the steering wheel body 10, the lower cover 47 is secured to the steering wheel body 10 with screws (not shown).

The horn switch mechanism of the steering wheel thus constructed is operated by depression of the horn pad 21. In this operation, a depression force applied to the horn pad 21 is transmitted to the upper electrode (the positive electrode) of the membrane switch 123 provided below it, so that the upper electrode touches the lower electrode (the negative electrode). Therefore, the membrane switch 123 actuates the horn. Accordingly, the operator can positively feel through the fingers that the horn pad 21 has come to the end of the horn operating stroke since the air bag embracing member 125 is substantially rigid.

Also, the air bag device and the membrane switch can be provided as the first assembly with the air bag held folded. This feature contributes greatly to the improvement installation of the air bag device and the membrane switch.

Further, the membrane switch in the above embodiment outputs electric current in accordance with depression of the horn pad. However, it should be also allowable to adopt a membrane switch which can vary electric resistance, amount of electric current and dielectric constant thereof in accordance with depression of the horn pad.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A steering wheel assembly comprising:
   a steering wheel body including a core covering portion;
   a boss plate disposed below said steering wheel body;
   an air bag device including a folded air bag and an air bag inflator, said air bag device being fixedly secured to said boss plate;
   a horn pad provided above said air bag device, said horn pad being substantially integral with said core covering portion of said steering wheel body;
   a substantially rigid depressing plate provided immediately below said horn pad, said depressing plate including a breakable portion in a top wall thereof which is constructed and arranged to be broken by inflation of said air bag, wherein said depressing plate is arranged so as to straddle said folded air bag and is movable in accordance with depression of said horn pad; and
   a horn switch mechanism actuable by depressing said horn pad, said horn switch mechanism including at least one resilient member which opposes depression of said depressing plate, and at least one pair of electrical contacts, said at least one resilient member and said at least one pair of electrical contacts being provided between said depressing plate and the boss plate.

2. A steering wheel as claimed in claim 1, wherein said actuating means is a first assembly which is assembled with said air bag device.

3. A steering wheel as claimed in claim 2, wherein said boss plate is a second assembly which is assembled with said first assembly.

4. A steering wheel assembly comprising:
   a steering wheel body including a core covering portion;
   a boss plate disposed below said steering wheel body;
   an air bag device including a folded air bag and an air bag inflator, said air bag device being fixedly secured to said boss plate;

a horn pad provided above said air bag device, said horn pad being substantially integral with said core covering portion of said steering wheel body;

a substantially rigid depressing plate provided immediately below said horn pad, said depressing plate including a breakable portion in a top wall thereof which is constructed and arranged to be broken by inflation of said air bag, wherein said depressing plate is arranged so as to straddle said folded air bag and is movable in accordance with depression of said horn pad; and a horn switch mechanism actuable by depressing said horn pad, said horn switch mechanism including at least one resilient member which opposes depression of said depressing plate, and at least one pair of electrical contacts, said at least one resilient member and said at least one pair of electrical contacts being provided between said depressing plate and the boss plate, and wherein said folded air bag is temporarily compressed and bound with a restraining member adapted to be broken upon inflation of said air bag, wherein a gap is formed between said air bag and said depressing plate which is wider than a distance of travel of said horn pad necessary to actuate said horn switch mechanism.

5. A steering wheel assembly comprising:

a steering wheel body including a core covering portion and a spoke core;

a boss plate disposed below said steering wheel body;

an air bag device including a folded air bag and an air bag inflator;

a horn pad provided above said air bag device;

a membrane switch provided immediately below said horn pad and being actuable by depression of said horn pad; and an air bag embracing member holding said air bag folded, said air bag embracing member being arranged so as to straddle said folded air bag and to be supported on a rear side of said air bag, said embracing member including a top wall which has a breakable portion constructed and arranged to be broken by inflation of said air bag, said top wall being substantially covered by said membrane switch except at said breakable portion, wherein said membrane switch constitutes a first assembly combined with said air bag device.

6. A steering wheel assembly as claimed in claim 5, wherein said embracing member is substantially rigid.

7. A steering wheel as claimed in claim 5, wherein said horn pad is substantially integral with said core covering portion of said steering wheel body and is separated from said spoke core, and wherein said boss portion constitutes a second assembly which is combined with said first assembly.

8. A steering wheel assembly provided with an air bag device comprising:

a steering wheel body including a core and a core covering portion;

a boss plate disposed below said steering wheel body;

an air bag device including an air bag and an air bag inflator, said air bag device being fixedly secured to said boss plate;

a depressible horn pad provided above said air bag device;

means for actuating a horn switch when said horn pad is depressed, wherein said horn pad is integral with said core covering portion of said steering wheel body, and wherein said actuating means comprises a depressing plate which is depressingly movable according to depression of said horn pad, at least one resilient member which resists depression of said depressing plate, and at least one pair of opposing electrical contacts.

9. A steering wheel assembly as claimed in claim 8, wherein said depressing plate is substantially rigid.

10. A steering wheel assembly as claimed in claim 8, wherein said depressing plate has a breakable portion in a top wall thereof which is constructed and arranged to be broken upon inflation of said air bag.

11. A steering wheel assembly as claimed in claim 8, wherein said air bag embracing member is substantially rigid.

12. A steering wheel assembly provided with an air bag device comprising:

a steering wheel body including a core and a core covering portion;

a boss plate disposed below said steering wheel body;

an air bag device including an air bag and an air bag inflator, said air bag device being fixedly secured to said boss plate;

a depressible horn pad provided above said air bag device;

means for actuating a horn switch when said horn pad is depressed, wherein said actuation means includes a membrane switch comprising a pair of opposing substantially planar film electrodes and an air bag embracing member holding said air bag folded, and wherein said air bag embracing member includes a breakable portion in a top wall thereof which is constructed and arranged to be broken upon inflation of said air bag, said top wall of said air bag embracing member being substantially covered by said membrane switch except at said breakable portion thereof.

13. A steering wheel assembly as claimed in claim 12, wherein said air bag embracing member is substantially rigid.

14. A steering wheel assembly provided with an air bag device comprising:

a steering wheel body including a core and a core covering portion;

a boss plate disposed below said steering wheel body;

an air bag device including an air bag and an air bag inflator, said air bag device being fixedly secured to said boss plate;

a depressible horn pad provided above said air bag device;

means for actuating a horn switch when said horn pad is depressed, wherein said actuating means comprises a depressing plate which is depressingly movable according to depression of said horn pad, at least one resilient member which resists depression of said depressing plate, and at least one pair of opposing electrical contacts, and wherein said folded air bag is temporarily compressed and bound with a breakable restraining member which is constructed and arranged to be broken upon inflation of said air bag, wherein a gap is formed between said air bag and said depressing plate which is wider than a distance of travel of said depressing plate necessary for actuating said horn switch.

* * * * *